Patented June 12, 1951

2,556,880

UNITED STATES PATENT OFFICE 2,556,880

SYNTHETIC OILS AND RESINS AND METHODS OF PRODUCING SAME

Fred Lowey, Kew Gardens, N. Y., assignor to Solar Manufacturing Corporation, New York, N. Y., a corporation of New York No Drawing. Application August 17, 1945, Serial No. 611,257

18 Claims. (Cl. 260—649)

This invention relates to methods of preparing and the products comprising non-halogenated and halogenated synthetic oils and resins prepared by the intermolecular condensation of toluene and its homologs and derivatives of these hydrocarbons in which one or more halogen atoms have been substituted in the ring and side chain halogenated toluene and its homologs. More specifically, the invention relates to methods of producing and the products resulting from the intermolecular condensation of toluene, chlorinated in the ring and toluene, chlorinated both in the ring and in the side-chain.

A more specific object of the invention is to provide methods of the above types including a procedure for the purification of the resulting condensation products.

A still further object of the invention is the provision of a method whereby the condensation products which are mixtures of non-halogenated or halogenated isomers having different numbers of nuclei may be fractionated to produce oil fractions and resins having different physical characteristics.

A still more specific object of the invention is to provide a method which is simple and inexpensive for the production of hydrocarbon compounds and derivatives of general utility, comprising generally halogenated, and more specifically, chlorinated compounds containing two or more phenyl groups joined together by one or more single aliphatic carbon atoms, at least one of the phenyl groups containing one or more methyl substituents.

Another object of the invention is the provision of a novel method and the products thereof for producing oily, resinous, non-crystalline, high molecular, condensation products in good yields of excellent electrical properties.

Still another object of the invention is the production of non-inflammable synthetic oils and resins particularly useful in circuit breakers, oil switches, transformers, electrical condensers, and the like.

Other and more detailed objects of the invention will be apparent from the following description thereof.

This invention resides substantially in the steps and series of steps comprising the processes and the products thereof as claimed.

Methods of halogenating toluene are well known in the chemical arts. When toluene is contacted with chlorine, for example, at room temperature in the presence of a suitable catalyst such as, for example, iron, iron chloride, aluminum chloride, and indeed any of the commonly used catalysts characterized as carriers in halogenation, the chlorine substitutes the hydrogen attached to the ring. On the other hand, if toluene is contacted with chlorine while it is being heated, chlorine is substituted for hydrogen in the alkyl side chain. This substitution can be accelerated in the presence of actinic rays. The product of the former reaction is chlorotoluene of which there are three possible isomers or/and more highly chlorinated ring substituted chlorination products, while in the latter case the product is benzylchloride or/and more highly chlorinated side-chain substitution products.

In accordance with this invention, the chlorination of toluene, for example, is effected in such manner that a condensation of toluene which is chlorinated in the ring takes place with toluene which is chlorinated in the side-chain or in both the ring and the side-chain.

A better understanding of this invention will be possible by setting out, as is done below, the following basic compounds resulting from the halogenation as, for example, the chlorination of toluene remembering, of course, that the result of the process is the production of a mixture of isomers.

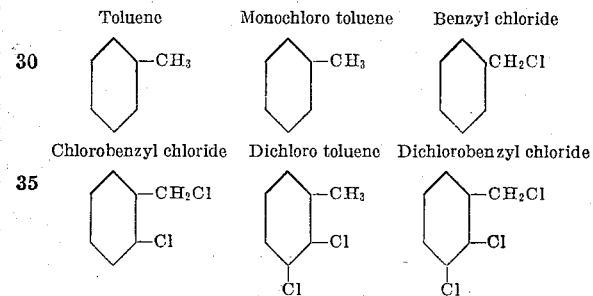

A detailed description of the process of this invention will be given assuming the use of chlorine, it being recognized, however, that other halogens such as bromine could just as well be used.

Toluene is halogenated as for example chlorinated in the usual manner to produce monochlorotoluene. For example, chlorine gas is introduced directly into toluene in the presence of iron as the catalyst. Since the reaction is exothermic the reaction vessel is kept preferably at a temperature of 40 to 50° C. Practically all of the toluene is converted to monochlorotoluene after about two hours, although there will be produced a small percentage of dichlorotoluene as is well understood in the art. The reaction mass is then heated above a temperature of 100° C. but preferably at boiling temperature. Boiling begins at about 150 to 155° C. and additional chlorine is introduced into the vapor space above the surface of the boiling liquid or directly into the mass, preferably near its surface. Boiling with refluxing of the vapors is continued until most of the chlorotoluene has reacted by which time the boiling temperature will have reached about 180° C. During the boiling period the reaction mass preferably is exposed to actinic rays either by direct illumination by sunlight or by exposure to ultra-violet rays to promote side chain chlorination of the monochlorotoluene, resulting in the formation of monochlorobenzylchloride. As rapidly as the monochlorobenzylchloride is formed, it reacts with the monochlorotoluene in the presence of the iron which now acts as a condensing agent (Friedel-Crafts reaction) producing a mixture of the condensation products of this invention. These reactions, that is chlorination and condensation, are continued until most of the chlorotoluene has been reacted. Hydrogen chloride is generated during the reaction and is absorbed and recovered.

The reaction product is washed with water to remove all iron in solution, and is then ready for distillation.

The mixture of condensation products is fractionally distilled to separate several different product mixtures. The reaction mass is first distilled at atmospheric pressure until it reaches a temperature of about 200° C. Distillation is continued, preferably under a reduced pressure of about 5 mm. of mercury, until a temperature of 180° C. at that pressure is reached. This distillate which is taken off under these conditions and which may be termed the "forerun" consists mainly of chlorotoluene, dichlorotoluene, a small quantity of trichlorotoluene and a small quantity of chlorobenzylchloride. Distillation continues and the first oil fraction which is taken off in the temperature range of 190° C. to 240° C. under a pressure of about 5 mm. of mercury comprises one of the desired products of this invention. It is described as a mobile oily liquid which is nearly water white and exhibits a bluish fluorescence.

The second oily fraction is taken off in the temperature range of 240° C. to 290° C. at a pressure of 5 mm. of mercury to produce another product of this invention which is an oily liquid of light greenish color and of higher viscosity than the previous fraction.

Both fractions have very desirable electrical properties as, for example, high insulation resistance and a high dielectric constant of about 5.3 to 5.5.

Distillation is continued until a temperature of about 350° C. is reached at the same reduced pressure during which there is taken off a fraction which is a solid light colored resin which may be dissolved in either of the previously described oil fractions. All of these products have excellent thermal stability, are non-hygroscopic and their boiling temperature ranges from 320° C. to 450° C. at atmospheric pressure depending on the degree of condensation, that is the number of nuclei present and the degree of halogenation and they have a specific gravity range of from 1.20 to 1.40 at 25° C. depending upon the degree of halogenation. The products with higher boiling points and, of course, higher viscosity are preferably used in electrical apparatus. The above characteristics apply generally when any of the halogens referred to above are used. These halongenated products also have the additional characteristic of being non-inflammable.

By way of comparison the following table illustrates the average yields of the various fractions, although these proportions can be widely varied as those skilled in the art will appreciate.

|  | Per cent |
|---|---|
| Forerun | 40 |
| First oil fraction | 20 |
| Second oil fraction | 20 |
| Resin | 10 |
| Pitch residue | 10 |

The pitch residue remaining after distillation, as described in detail above, is a black pitch or waxlike substance and comprises a valuable by-product for many uses. The forerun may be re-used in new batches or as a by-product and hence is not wasted.

Both oil fractions are purified by preferably first redistilling them, by treatment with an alkaline solution such as 5% KOH in water and treatment with fuller's earth or other well known suitable adsorbents. After treatment with an alkaline solution, these fractions are agitated with fuller's earth and then filtered through a bed of fuller's earth's to produce the final products.

These final products are useful for many purposes but are particularly useful, especially the chlorinated products, in electrical apparatus as, for example, transformers, oil switches, circuit breakers, electrical condensers, and the like.

The basic reactions of the process as described above may be expressed symbolically as below which is done for the purposes of further disclosing the nature of the reactions and the resulting products.

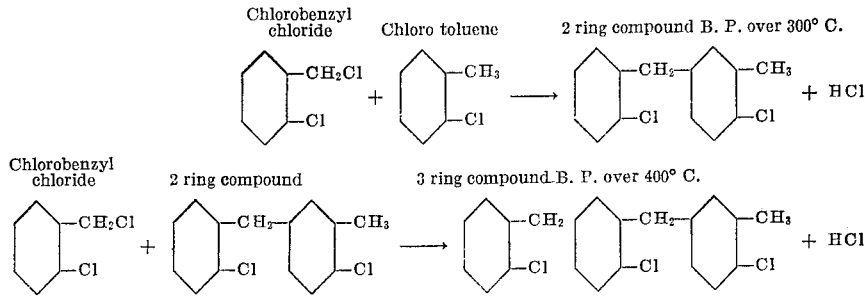

The basic hydrocarbon of the first oil fraction can, in accordance with standard nomenclature practice, be given several names as, for example, methyldiphenylmethane, benzyltoluene or phenyltolylmethane. The basic hydrocarbon of the second oil fraction is methylbenzyldiphenylmethane. The reaction can be carried further in accordance with the equations above, and as indicated above to produce a compound mixture having four nuclei which product could be called benzyl-methylbenzyl-diphenylmethane.

It will be understood by those skilled in the art that the products of this invention are mixtures of isomers of ring substituted halogen derivatives of hydrocarbons containing one, two or more halogen atoms for each benzene ring, depending upon the degree of halogenation. As a generalization it can be stated that the more nuclei in the product the higher its boiling point and viscosity. As indicated above, other homologs of benzene as xylene and mesitylene can be used to produce oil and resinous condensation products of characteristics similar to those herein disclosed. Due to the fact that two side chains may be halogenated and, therefore, enter into the Friedel-Crafts reaction, a very large number of products with complex structures can be obtained in accordance with the principles of this invention.

It will be apparent in view of the foregoing disclosure that the process may be followed with the variation that the toluene is first halogenated for example chlorinated to the extent that dichlorotoluene is produced followed by the same procedure as given above for the monochlorotoluene to produce several oil or resin fractions resulting from the reaction of dichlorotoluene with dichlorobenzylchloride. The first oil fraction of the dichlorotoluene process appears to have better electrical characteristics than the first oil fraction of the monochlorotoluene process. On the other hand, the second oil fraction of the dichlorotoluene process appears to have about the same electrical properties as the second oil fraction of the monochlorotoluene process.

The various products of this invention are especially useful in the electrical arts as previously explained. However, from a still broader viewpoint the following advantages stand out:

1. The cost of these products is low because the raw material from which they are made is cheap.
2. These products are relatively light in weight because of the relatively low chlorine content.
3. Their dielectric constants are high.
4. Their heat stability is high.
5. They have high boiling points.
6. The process for producing them is simple and, therefore, inexpensive.

The objects of this invention are attained by the following process which procedurally consists of the omission of the first step of the previously described process. By the omission of this step which in that process is a chlorination step, there is no chlorination of the ring structure and by this modified process non-substituted hydrocarbons may be obtained. In practicing this modified process the halogen as, for example, chlorine gas, is introduced directly into the vapors of boiling toluene or its homologs in the presence of a condensing agent and preferably actinic rays such as those previously mentioned. The mixture of condensation products resulting is fractionated and purified as previously described to give a series of products which have no chlorine in the ring structures.

A careful study by one skilled in the art of the products produced by the various processes herein disclosed will demonstrate that they may be generally classified as aromatic compounds which may or may not contain halogen substituents in the ring containing two or more phenyl groups joined by one or more single aliphatic carbon atoms at least one of the phenyl groups containing one or more methyl substituents.

From the above description it will be apparent that the subject matter of this invention involves a wide range of novel products which may be varied within limits in their chemical, physical and electrical properties within the scope of that range, and which are produced by a process which is capable of variations in a manner which will be apparent to those skilled in the art. I do not, therefore, desire to be strictly limited to the disclosure as herein given, but rather by the scope of the claims granted me.

What is claimed is:

1. A process which comprises heating chlorinated derivatives of toluene in which the chlorine is substituted in the ring and reacting it at a temperature of at least about 100° C. with chlorine gas in the presence of a condensing agent capable of promoting a Friedel-Crafts reaction to produce condensation products of the ring substituted chlorinated derivatives of toluene and ring substituted chlorinated derivatives of benzyl chloride.

2. In the process of claim 1, the reaction being performed in the presence of actinic rays, in addition to the presence of the condensing agent.

3. In the process of claim 1, the ring substituted chlorinated derivative of toluene being predominately monochlorotoluene.

4. In the process of claim 1, the reaction being performed in the presence of actinic rays in addition to the presence of the condensing agent and the ring substituted chlorinated derivative of toluene being monochlorotoluene.

5. In the process of claim 1, the ring substituted chlorinated derivative of toluene being predominately dichlorotoluene.

6. In the process of claim 1, the reaction being performed in the presence of actinic rays in addition to the presence of the condensing agent, and the substituted chlorinated derivative of toluene being predominately dichlorotoluene.

7. A process which comprises heating halogenated derivatives of toluene in which the halogen is substituted in the ring and reacting them at a temperature of at least about 100° C. with one of the group consisting of chlorine and bromine in the presence of a condensing agent capable of promoting a Friedel-Crafts reaction to produce condensation products of ring-substituted halogenated derivatives of toluene and of benzyl halides of the group consisting of benzyl chloride and benzyl bromide and condensation products of the ring-substituted halogenated derivatives of the same group with the previously formed condensation products.

8. In the method of claim 7, the halogenated derivative of toluene in which the halogen is substituted in the ring being predominately the monohalogenated derivative and the ring-substituted halogenated derivative of the group consisting of benzyl chloride and benzyl bromide being predominately the monohalogenated derivative.

9. In the method of claim 7, the halogenated derivative of toluene in which the halogen is substituted in the ring being predominately the monohalogenated derivative and the ring-substituted halogenated derivative of the group consisting of benzyl chloride and benzyl bromide being predominately the monohalogenated derivative and effecting condensation in the presence of actinic rays.

10. In the process of claim 7, the reaction being performed in the presence of actinic rays in addition to the presence of the condensing agent.

11. In the method of claim 7, the halogenated derivatives of toluene in which the halogen is substituted in the ring being predominately dihalogenated derivatives and a ring-substituted halogenated derivative of the group consisting of benzyl chloride and benzyl bromide being predominately the dihalogenated derivative.

12. In the method of claim 7, the halogenated derivatives of toluene in which the halogen is substituted in the ring being predominately dihalogenated derivatives and a ring-substituted halogenated derivative of the group consisting of benzyl chloride and benzyl bromide being predominately the dihalogenated derivative, and the reaction being performed in the presence of actinic rays, in addition to the presence of the condensing agent.

13. A process which comprises heating to a boiling temperature an aromatic hydrocarbon of the group consisting of toluene, xylene and mesitylene and reacting its vapors with a halogen of the group consisting of chlorine and bromine in the presence of a condensing agent capable of promoting Friedel-Crafts reaction to produce condensation products of said hydrocarbon and the resultant halide formed by the reaction with the halogen.

14. In the method of claim 13, the reaction being performed in the presence of actinic rays, in addition to the presence of the condensing agent.

15. A new product corresponding to the following general chemical formula:

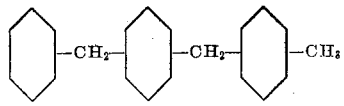

at least one of the rings in said product containing at least one halogen substituent.

16. A new product corresponding to the following general chemical formula:

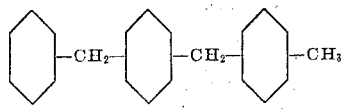

in which all of the rings in said product contain at least one halogen substituent.

17. A process which comprises heating chlorinated derivatives of toluene in which the chlorine is substituted in the ring and reacting it at an elevated temperature with chlorine gas in the presence of a condensing agent capable of producing a Friedel-Crafts reaction to produce condensation products of the ring substituted chlorinated derivatives of toluene and ring substituted derivatives of benzyl chloride.

18. A process which comprises heating halogenated derivatives of toluene in which the halogen is substituted in the ring and reacting them at an elevated temperature with one of the group consisting of benzyl chloride and benzyl bromide and condensation products of the ring-substituted halogenated derivatives of the same group with the previously formed condensation products.

FRED LOWEY.

REFERENCES CITED

The following references are of record in the file of this patent:

UNITED STATES PATENTS

| Number | Name | Date |
|---|---|---|
| 2,012,302 | Clark et al. | Aug. 27, 1935 |